P. H. WILLIAMS.
STAVE JOINTING MACHINE.
APPLICATION FILED MAY 5, 1911.

1,028,648.

Patented June 4, 1912.
8 SHEETS—SHEET 1.

Witnesses
O. B. Hopkins

Inventor
P. H. Williams
by H. B. Willson & Co.
Attorneys

P. H. WILLIAMS.
STAVE JOINTING MACHINE.
APPLICATION FILED MAY 5, 1911.

1,028,648.

Patented June 4, 1912.

Witnesses
C. Clinton
O.B. Hopkins

Inventor
P.H. Williams
by H.B. Willson & Co
Attorneys

P. H. WILLIAMS.
STAVE JOINTING MACHINE.
APPLICATION FILED MAY 5, 1911.

1,028,648.

Patented June 4, 1912.
8 SHEETS—SHEET 8.

Witnesses
C. [illegible]
O. B. Hopkins

Inventor
P. H. Williams
by H. B. Willson & Co.
Attorneys

UNITED STATES PATENT OFFICE.

PERRY HAZARD WILLIAMS, OF MEMPHIS, TENNESSEE, ASSIGNOR OF ONE-HALF TO G. GRONAUER, OF MEMPHIS, TENNESSEE.

STAVE-JOINTING MACHINE.

1,028,648.     Specification of Letters Patent.     Patented June 4, 1912.

Application filed May 5, 1911. Serial No. 625,201.

*To all whom it may concern:*

Be it known that I, PERRY HAZARD WILLIAMS, a citizen of the United States, residing at Memphis, in the county of Shelby and State of Tennessee, have invented certain new and useful Improvements in Stave-Jointing Machines; and I do declare the following to be a full, clear, and exact description of the invention, such as will enable others skilled in the art to which it appertains to make and use the same.

This invention relates to improvements in jointing machines for barrel staves.

One object of the invention is to provide a jointing machine of this character having an improved construction and arrangement of traveling saw adapted to cut a curved face, also to form a perfect under cut and to give the proper quarter on each end and bilge.

Another object is to provide an improved means for guiding the traveling saw carriage in a curved line together with an improved mechanism for holding and presenting the stave to the saw to be jointed.

Still another object is to provide an improved means to indicate the sawing line and to form a yielding stop for the stave when placed in position to be sawed, thereby preventing waste of stock.

With these and other objects in view, the invention consists of certain novel features of construction, combination and arrangement of parts as will be more fully described and particularly pointed out in the appended claims.

In the accompanying drawings: Fig. 23 is a vertical cross sectional view on the line 23—23 of Fig. 22; Fig. 28 is a plan view of the stave showing the shape of the same when cut by my improved jointer machine.

Figure 4:
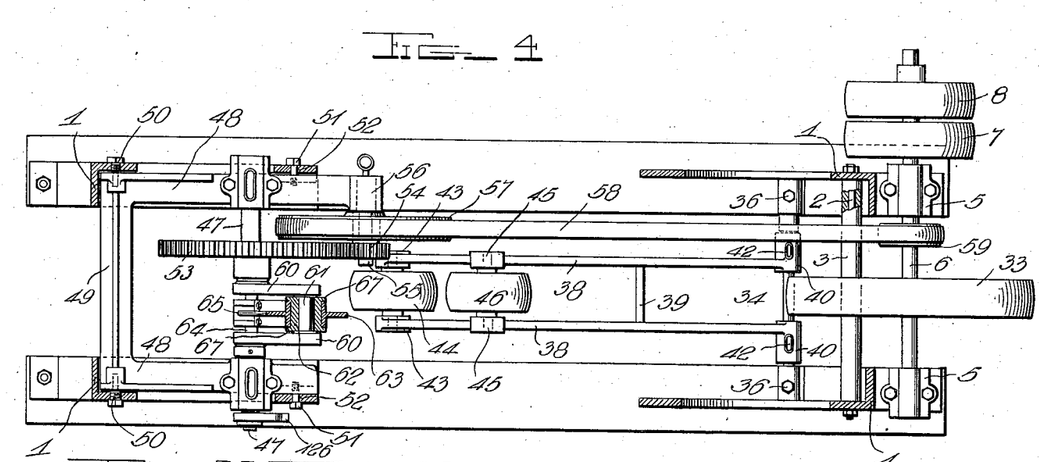
Fig. 4 is a horizontal section taken above the main driving or operating mechanism of the machine.

My improved stave jointing machine comprises a main frame 1, said main frame consisting of parallel side frames or members which are secured together in parallel relation and spaced a suitable distance apart by tie bolts 2 on which are arranged spacing sleeves 3 as clearly shown in Fig. 4 of the drawing. The side members of the frame are preferably of angle iron construction and on the flat upper edges of said side members are arranged wear or track plates 4 on which are adapted to travel the supporting wheels or rollers of a traveling saw carriage hereinafter described. Formed on one end of the side members of the frame are bearing brackets 5 in which is revolubly mounted a main driving shaft 6 on one end of which are mounted tight and loose pulleys 7 and 8 with which are adapted to be engaged a driving belt (not shown). Arranged above the pulleys 7 and 8 is a suitable belt shifter which is here shown and preferably comprises a transversely disposed operating rod 9, which is arranged through and slidably engaged with the side members of the frame and is provided on its front end with a handle 10 and has secured in its opposite end downwardly and rearwardly projecting belt engaging arms 11, by means of which when the rod is projected and retracted the belt will be shifted back and forth from the loose to the tight pulley.

Figures 5, 6, 7, 8, 9, 10:
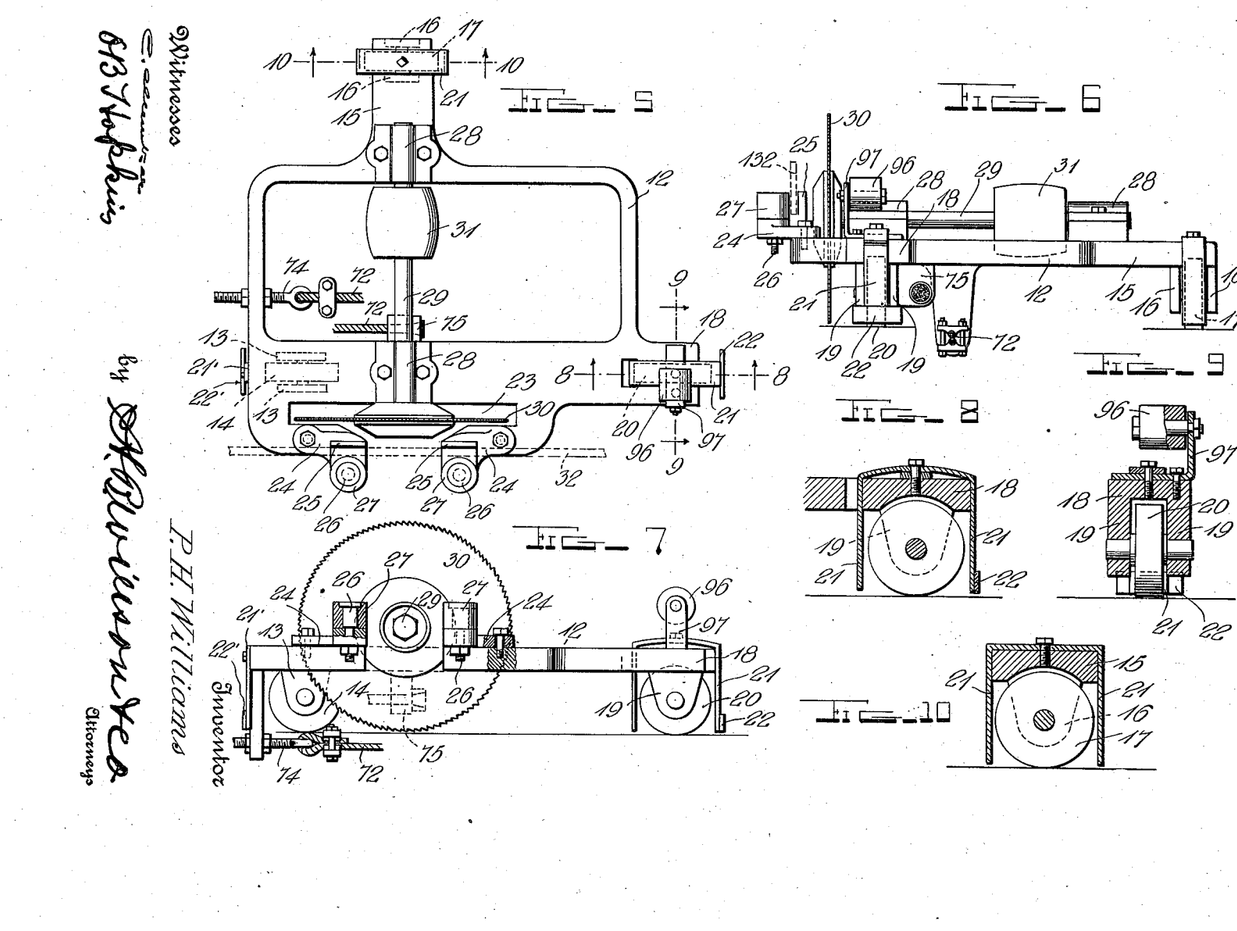
Fig. 5 is a plan view of the saw carriage.
Fig. 6 is a rear end view thereof.
Fig. 7 is a side view of the same partly in section.
Fig. 8 is a detail vertical longitudinal section through the carriage on the line 8—8 of Fig. 5.
Fig. 9 is a cross sectional view through the carriage on the line 9—9 of Fig. 5.
Fig. 10 is a detail vertical longitudinal section through the carriage on the line 10—10 of Fig. 5.

Adapted to travel on the wear or track plates 4 on the upper edges of the side members of the frame is my improved saw carriage 12, said carriage comprising an open substantially rectangular frame on which adjacent to its forward end and near one side are formed depending bearing lugs 13 between which is revolubly mounted a front supporting wheel or roller 14. On the opposite side of the frame is formed a lateral extension 15 having on its under side depending bearing lugs 16 with which is revolubly engaged a side supporting roller 17. On the rear end of the frame opposite to that having the extension 15 is formed a rearwardly projecting extension 18 having on its under side depending bearing lugs 19 with which is revolubly engaged a rear supporting roller 20. The roller 20 is in line with the roller 14 and said rollers are adapted to engage the wear plate on one of the side members of the frame, while the roller 17 on the opposite side of the carriage is adapted to engage the wear plate on the opposite side member of the frame. The rollers 17 and 20 are preferably provided with fenders 21 in the form of inverted U-shaped plates which are engaged with the extensions 15 and 18 of the carriage frame and secured thereto by suitable fastening screws as shown. When thus arranged the depending ends of the fenders are disposed immediately in front and rear of the rollers and thus remove any chips or obstructions from the path of the rollers. The rear depending end of the fender of the rear roller 20 is preferably provided on its lower end with a transversely disposed sweep plate 22 which is provided to more effectually clear the track or wear plate of said roller from any obstructions which might interfere with the travel of the carriage. For the same purpose I secure to the opposite end of the carriage in front of the roller 14 a fender 21' to the lower end of which is secured a transversely disposed sweep plate 22'.

On one side of the carriage is formed a lateral extension having therein a longitudinally disposed slot 23, which opens through the outer side of the extension as shown. On the ends of the extension formed by the opening therethrough are secured guide supporting brackets 24, on the outer laterally projecting ends of which are formed upwardly projecting guide lugs 25 adjacent to which, and in the outer ends of the brackets 24 are secured bearing bolts 26 on the upper portions of which are revolubly mounted vertically disposed guide rollers 27. The rollers 27 are spaced a suitable distance from the lugs 25 whereby said lugs are adapted to be engaged with the opposite sides of a guide rail hereinafter described.

Extending transversely across the frame of the carriage 12 and revolubly mounted in suitable bearings 28 is a saw arbor or shaft 29 on the outer end of which is fixedly mounted a circular saw 30, said saw being arranged to operate in the slot 23 of the carriage frame as shown. On the shaft or arbor 29 of the saw within the carriage frame is fixedly mounted an operating pulley 31 with which is engaged a saw operating belt 32, said belt being also engaged with a drive pulley 33 fixedly mounted on the main drive shaft 6 as shown. In order to take up the slack in the belt 32 and to keep the belt taut at all times when the saw carriage is in its various positions, I provide a suitable slack adjuster 33, said adjuster comprising a supporting shaft 34 which is arranged transversely in the lower portion of the main frame 1 and has its ends inserted through rectangular passages 35 formed in the opposite side members of said frame as shown. The ends of the shaft 34 are adjustably secured to the side members of the frame by means of upper and lower adjusting screws 36 the inner ends of which are engaged with the upper and lower sides of the shaft whereby the latter may be adjusted vertically to a limited extent and thus maintained in a perfectly level position. The screws 36 after being operated to adjust the shaft to the desired position are secured by jam nuts 37 arranged thereon as shown. Loosely connected with the shaft 34 are pulley supporting arms 38 which extend forwardly through the lower portion of the machine and are secured together in spaced relation by a cross head 39. On the inner ends of the arms 38 are formed bearing sleeves 40 which are pivotally mounted on the shaft 34 and are provided with suitable bushings 41 and oil cups and feed ports 42 as clearly shown in Fig. 22 of the drawing. The outer ends of the arms 38 are turned downwardly and have formed therein bearings 43 in which are revolubly mounted the trunnions of an outer belt engaging roller 44 which is adapted to be engaged with the lower stretch of the saw operating belt 32. On the upper edges of the arms 38 near their outer ends are formed bearing lugs 45 with which are revolubly engaged the trunnions of an upper belt engaging pulley 46, said pulley being adapted to engage the upper stretch of the belt 32. By thus engaging the pulleys 44 and 46 with the belt 32 the weight of the pulleys and the frame 38 will keep the belt 32 stretched irrespective of the position of the saw carriage, said arms and pulleys swinging up and down when the belt is slack or drawn up by the forward and backward movement of the carriage.

Figure 1:
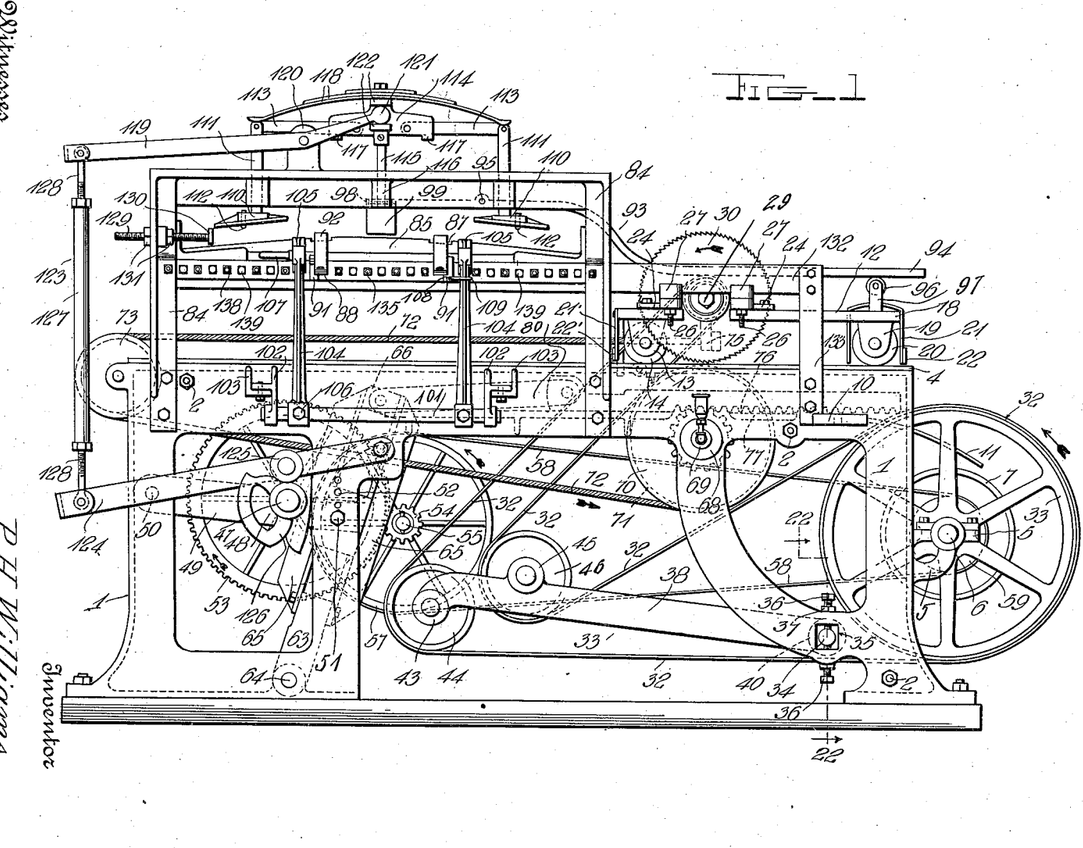
Figure 1 is a front view of my improved jointing machine.

The saw carriage reciprocating mechanism comprises a crank shaft 47 which is revolubly mounted in suitable bearings formed in the side members or arms 48 of an adjustable shaft supporting frame 49, said frame being pivotally supported at its outer end on bearing screws 50 arranged in the forward ends of the side members of the frame 1, as clearly shown in Figs. 1 and 4 of the drawings. The inner ends of the sides or arms 48 of the frame 49 are adjustably supported by means of supporting screws 51 which are adapted to be engaged with one of a series of holes 52 formed in the adjacent portions of the side members of the frame 1. By thus arranging the frame 49 the crank shaft 47 may be supported in any desired position in the main frame of the machine, said frame 49 being also adjustable for a purpose hereinafter described.

On the shaft 47 is fixedly mounted a spur gear 53 with which is operatively engaged a spur gear pinion 54 loosely mounted on a stub shaft 55 fixed in a bearing support 56 formed on an extension on one of the arms 48 of the frame 49 as clearly shown in Fig. 4 of the drawing. Formed integral with the pinion 54 on the shaft 55 is an operating pulley 57 which is connected by a belt 58 with a pulley 59 fixed on the main drive shaft 6 whereby the motion of said shaft is imparted to the crank shaft 47.

At a suitable position in the shaft 47 are arranged crank arms 60 the outer ends of which are connected by a pin 61 having a pivotal engagement with a block 62 which is slidably engaged with a rack operating arm 63, the lower end of which is connected with a supporting shaft 64 pivotally mounted in the lower portion of the side members of the main frame 1 as shown. The arm 63 consists of an inner member having connected to its outer end a pair of parallel T iron guide bars 65 which are spaced apart and secured at their upper ends to a connecting member 66. The crank connecting block 62 is slidably mounted between the flat inner sides of the bars 65 and said block is provided on its opposite sides with parallel guide flanges 67 which engage the opposite edges of the flat sides of the bars 65 and thereby hold said block in sliding engagement with the bars.

Figures 17, 19, 20, 21, 22:
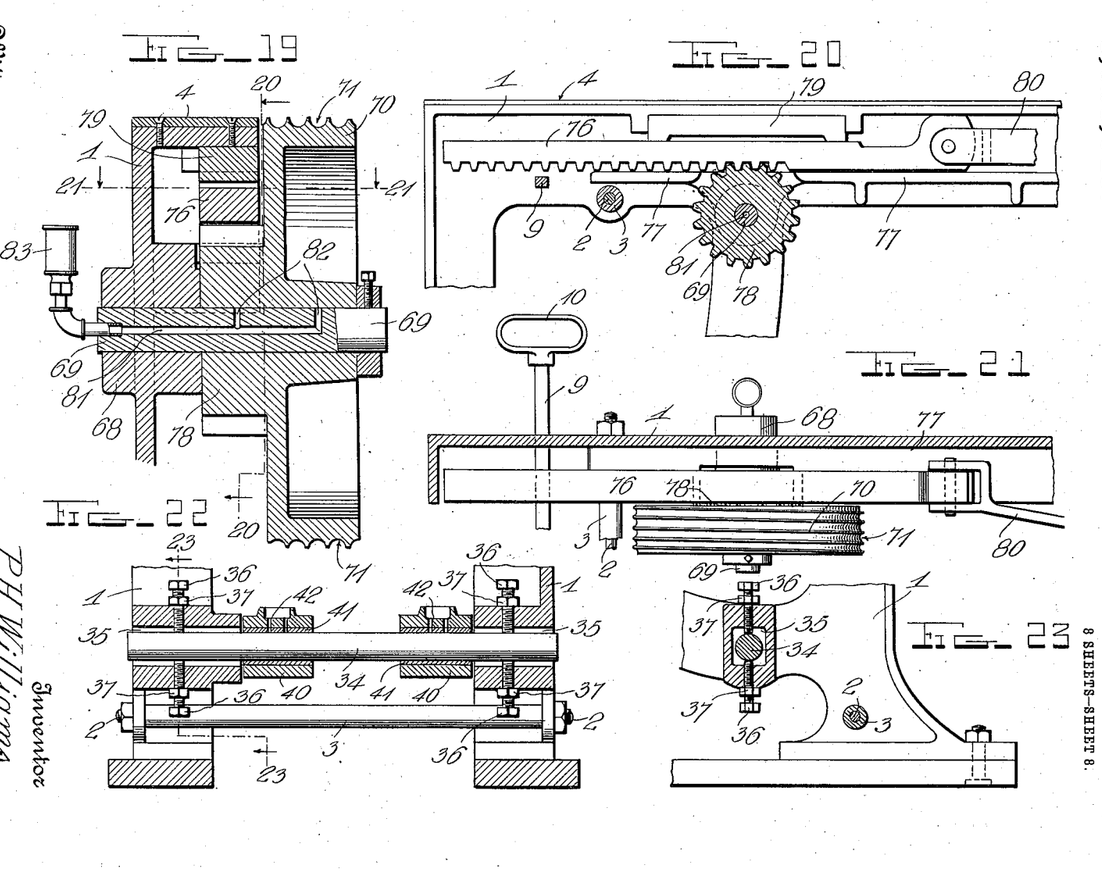
Fig. 19 is an enlarged vertical sectional view of a portion of the frame and the cable operating drum of the carriage reciprocating mechanism.
Fig. 20 is a vertical sectional view on the line 20—20 of Fig. 19 showing the rack bar and pinion of the carriage reciprocating mechanism.
Fig. 21 is a horizontal sectional view on the line 21—21 of Fig. 19.
Fig. 22 is a vertical cross section through the lower portion of the frame on the line 22—22 of Fig. 1 showing the supporting and connecting means for the slack adjusting mechanism of the saw operating belt.
Figure 24:
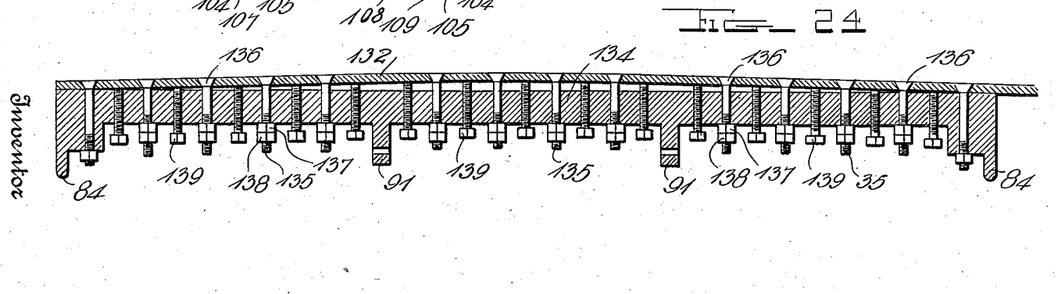
Fig. 24 is a horizontal sectional view through a portion of the guide rail for the saw carriage and the supporting and adjusting mechanism for said rail.

Fixedly mounted in a suitable bearing 68 arranged in one of the side members of the frame 1 is a drum supporting shaft 69 on the inner end of which is loosely mounted a cable operating drum 70, said drum having formed therein a spirally arranged groove 71 with which is adapted to be engaged a carriage reciprocating cable 72, said cable extending forwardly around a guide pulley 73 revolubly mounted in suitable bearing brackets on the forward end of the machine as shown. One end of the cable 72 is adjustably connected to the forward end of the saw carriage by an eye bolt 74 while the opposite end of the cable is connected to an attaching lug 75 formed on the carriage as shown. By thus connecting the ends of the cable the latter is practically endless and in order that the cable may obtain a firm engagement with the drum, the cable is preferably passed two or three times around the drum or engaged with two or three of the grooves therein as shown. By thus engaging the cable with the drum 70 and connecting the opposite ends of the cable with the saw carriage, it will be readily seen that when the drum is turned in one direction or the other the carriage will be moved in the corresponding direction. The drum 70 is revolved first in one direction and then the other by means of a rack bar 76 which is slidably mounted on a supporting flange 77 formed on the upper portion of one of the side members of the frame as clearly shown in Figs. 20 and 21 of the drawings. The teeth of the rack bar 76 are in operative engagement with the teeth of a pinion 78 formed integral with the cable operating drum 70 whereby when the rack bar is reciprocated, said pinion and drum will be revolved first in one direction and then the other. The rack bar 76 is held down in operative engagement with the pinion 78 by a guide plate 79 which is arranged in the side member of the main frame as shown in Fig. 20 of the drawings.

Figure 25:
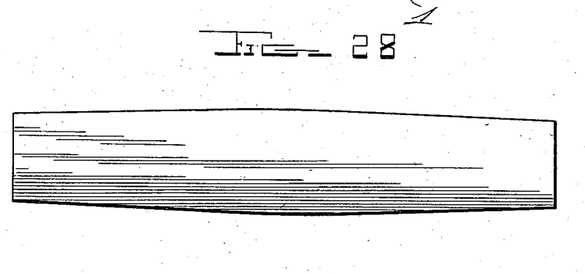
Fig. 25 is a detail side view of the pivoted operating arm for actuating the rack bar of the carriage reciprocating mechanism, showing in full and dotted lines the extreme positions of the arm on the working and return stroke of the saw carriage and indicating the difference in the distance the arm operating mechanism travels in swinging the arm to its extreme positions whereby more time is required for the return stroke of the carriage than for the working stroke.

The rack bar 76 is operatively connected at one end by a link 80 to the spacing member 66 in the upper end of the arm 63 whereby when said arm is swung back and forth the rack bar will be shifted first in one direction and then the other, thereby revolving the pinion 78 and shaft 69 as hereinbefore described to actuate the cable operating drum whereby the saw carriage is reciprocated to bring the saw thereon into and out of engagement with the work which is held in position to be engaged by the saw as will be hereinafter more fully described. The shaft 69 of the cable operating drum 70 has formed therein an oil passage 81 (see Fig. 19) and ports 82 whereby oil is conducted from an oil cup 83 connected to the outer end of the passage 81 to the bearing surface of the drum 70 and pinion 78. By means of the crank connection between the operating arm of the carriage reciprocating rack and the operating shafts 47 as herein shown and described it will be seen that the movement of the crank in its circle when swinging the arm 63 for the forward stroke or movement of the carriage is considerably less than the movement of the crank when swinging the arm back for the return stroke of the carriage so that more time is consumed on the return stroke than on the forward stroke of the carriage. This increase in the time of the return movement of the carriage permits the operator to remove the finished work, place the work in position to be cut or to reverse the same after one side of a stave has been cut. This movement of the rack operating arm 63 is clearly illustrated in Fig. 25 of the drawings.

In order to hold the work in proper position to be engaged and cut by the saw, I provide a supporting and holding mechanism comprising a frame 84 to the vertical side bars or standards of which are secured the ends of a lower stave holding member or plate 85, said plate being curved on its upper side from its outer ends toward its center to correspond with the bilge or curvature of the barrel staves. The stave supporting plate 85 is preferably cut away or recessed on its outer side between its ends as shown at 86 and is provided in its upper edges with notches 87 the purpose of which will be hereinafter described. The ends of the plate 85 are also curved transversely to conform to the transverse curvature of the staves. In order to receive and support the stave in proper position when applied to the plate 85 and before the clamping devices are brought into engagement with the staves I provide suitable stave supporting members 88 comprising narrow plates having formed on their lower sides slotted lugs 89 with which are engaged attaching screws 90 whereby said members 88 are adjustably secured to suitable supporting brackets 91 formed on a portion of the supporting frame 84. Secured to the lower ends of the members 88 are stave receiving springs 92 the upper ends of which are normally spaced a short distance above the upper ends of the members 88 and form a level support with which the staves are engaged when first placed in the machine and before being clamped into engagement with the plate 85. The upper ends of the members 88 when arranged in position on the frame 84 engage the notches 87 in the plate 85, said notches being of sufficient depth to receive both the members 88 and springs 92 when the latter are forced down by the stave when the same is clamped into engagement with the plate 85.

Figure 2:
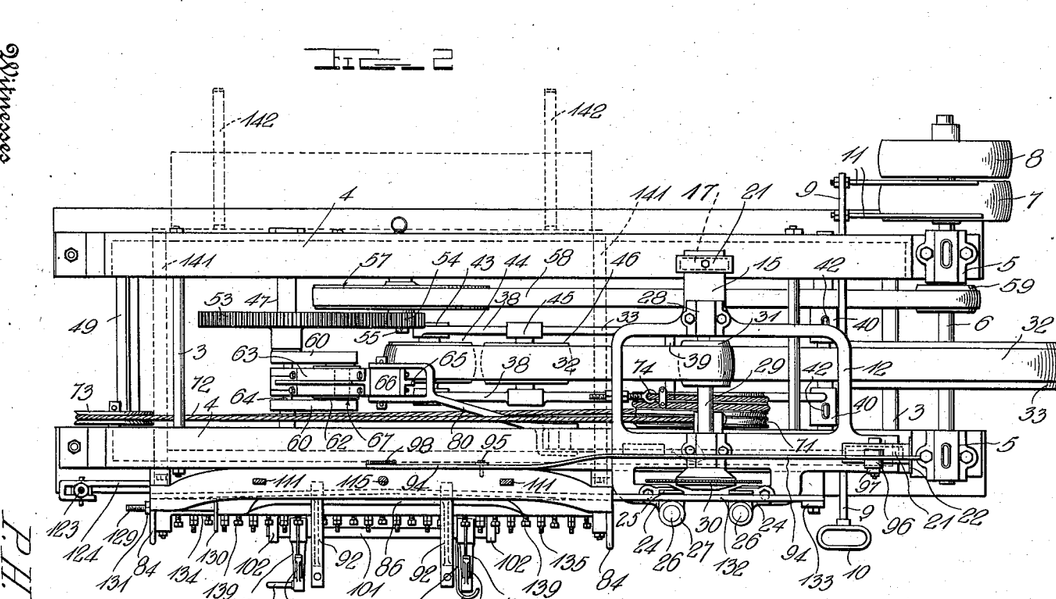
Fig. 2 is a top plan view.
Figure 26:
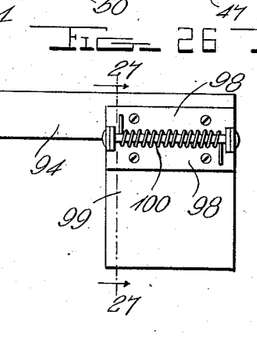
Fig. 26 is a rear view of the yielding gage or stop for indicating the position of the saw line.
Figure 27:
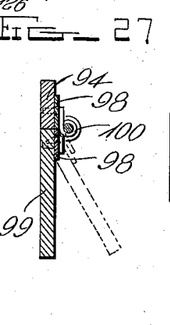
Fig. 27 is a vertical cross sectional view on the line 27—27 of Fig. 26.

In order to indicate to the operator the position of the saw line or the distance to which the stave should be pushed over before being fastened down for cutting, I provide a gage 93 comprising a curved supporting and operating bar 94, which is pivotally connected to the upper portion of the frame 84 as shown at 95 in Fig. 2 and has its outer end curved downwardly and disposed in the path of movement of a trip roller 96 which is revolubly mounted on a suitable bracket 97 secured to the extension 18 of the saw carriage whereby said arm is automatically operated by the movement of the carriage to bring the gage into operative position to receive the stave and to lift said gage after the stave has been fastened thus preventing the gage from interfering with the operation of the saw when cutting the stave. The gage 93 is preferably constructed in the form of a plate 99, hingedly secured as at 98 to the inner end of the bar 94 and yieldingly held in an operative position by a coiled spring 100 arranged on the pin of the hinge connection between the plate and the bar as clearly shown in Figs. 26 and 27 of the drawing. By thus hingedly connecting the gage and yieldingly holding the same in position by means of a spring as shown and described, the same will form a yielding stop and gage for indicating the saw line and position for the inner edge of the stave to be cut, and the plate may be pushed back by the stave in the event that the operator should desire to cut a greater amount of material from the edge of the stave or to split the latter. It will be understood that the gage is brought down and held in operative position by the engagement of the roller 96 with the downwardly curved rear end of the bar 94 and that as soon as the carriage has moved forward to a sufficient extent to disengage the roller 96 from the downwardly curved end of the bar 94 said end of the bar will, owing to its greater length and weight, drop and lift the forward end of the arm and the gage plate thereby preventing the latter from interfering with the saw. When the carriage moves back on its return stroke the roller 96 will again engage the downwardly curved end of the bar 94 and again swing the inner end of the same and gage plates down in position to receive the staves.

Figure 3:
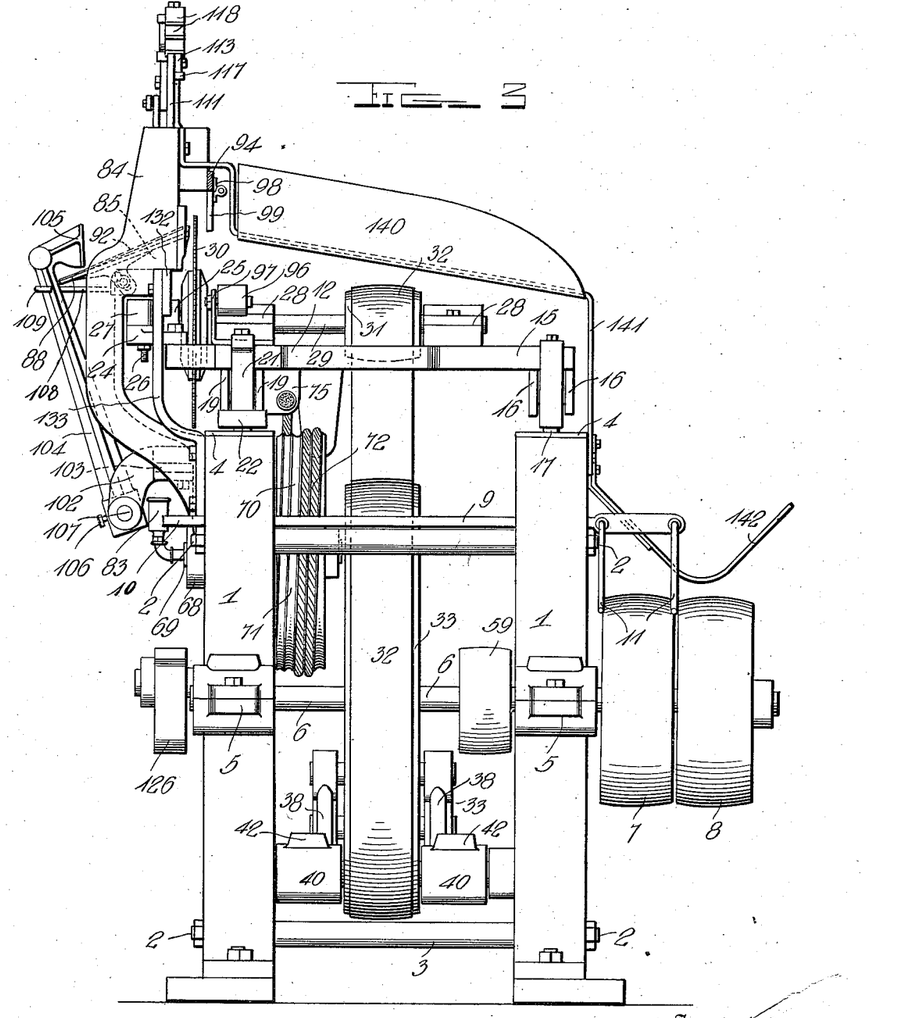
Fig. 3 is an end view.

In order that the stave may be moved evenly across the receiving springs 92 of the supporting members 88 so that the ends of the stave will both be brought into position to be cut alike by the saw, I preferably provide a stave adjusting and shifting mechanism comprising a rock shaft 101 which is pivotally mounted in bearing members 102 bolted or otherwise firmly secured to angle iron supporting brackets 103 formed on one of the side members of the main frame as clearly shown in Figs. 1 and 3 of the drawings. On the shaft 101 are fixedly mounted upwardly projecting arms 104 on the upper ends of which are formed angular stave engaging plates or members 105 which, when the arms are swung inwardly will engage the opposite ends of the stave resting on the supporting springs 92 and will shift said stave evenly across the springs to bring the inner edge of the same into engagement with the gage plate 99 and into position to receive the saw when brought into engagement therewith. The arms 104 are adjustably secured to the shaft 101 by means of set screws 106 and are adapted to be moved in unison. In order to move the arms into and out of engagement with the staves, I preferably provide one of said arms with an operating handle 107, said handle preferably projecting laterally from the outer side of the arms as shown. In order to limit the outward movement of the arms 104 and to support the same in an inoperative position, I provide a stop bar 108, the inner end of which is suitably secured to the frame 84 while the outer end has formed thereon a hook 109 with which the adjacent arm is engaged when the adjusting mechanism is swung outwardly to an inoperative position.

Figure 11:
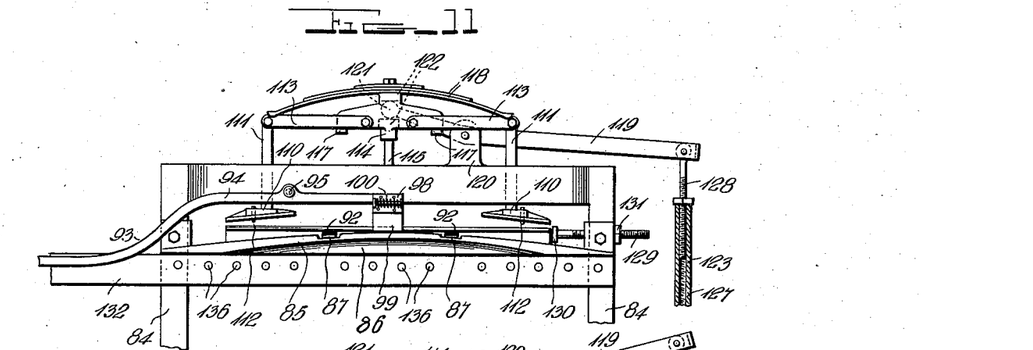
Fig. 11 is a rear view of the stave supporting and clamping mechanism showing the parts in inoperative position.
Figure 12:
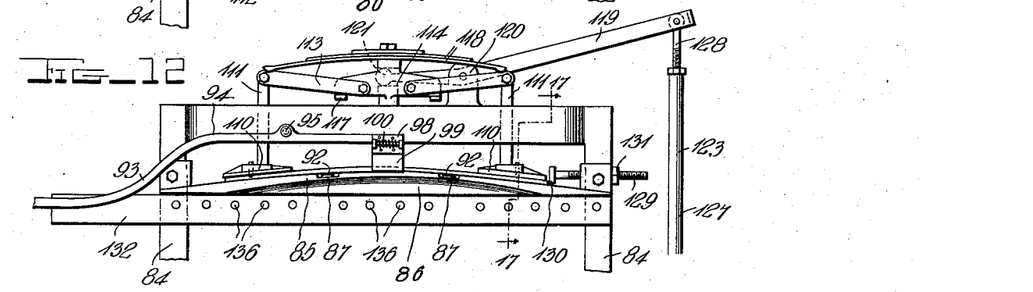
Fig. 12 is a similar view showing the parts in operative position.
Figures 13, 14:
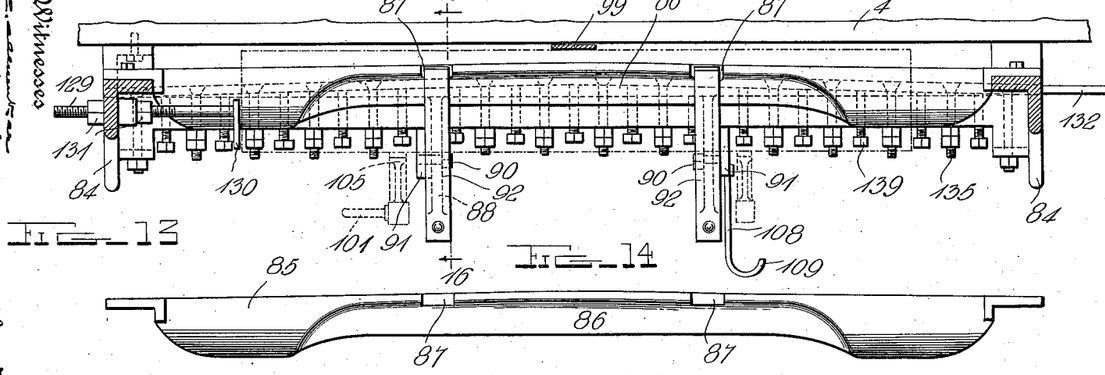
Fig. 13 is an enlarged plan view of the stave supporting mechanism and the adjusting mechanism for the saw carriage guide.
Fig. 14 is a plan view of the stave supporting plate and lower clamping member.

In order to clamp the staves down onto the curved upper surface of the plate 85 whereby the proper curvature or bilge is imparted to the stave while the same is being cut, I provide clamping members in the form of plates 110, said plates being firmly secured to the lower ends of plunger bars 111, which are slidably engaged with apertured guide passages formed in the upper portion of the frame 84. The clamping plates 110 are arranged at the proper angle for holding the ends of the stave down flat or into close engagement with the plate 85. In the plates 110 are preferably arranged dies 112 by means of which any desired characters or marks may be impressed into the staves when the clamping plates are brought into engagement therewith. The upper ends of the plunger bars 111 are pivotally connected to the outer ends of supporting links 113 the inner ends of which are pivotally connected to a cross head 114 secured to the upper end of a guide bar 115. The guide bar 115 is slidably engaged with an apertured boss 116 formed on the frame 84 as shown. The links 113 are supported in a horizontal position on the cross head 114 by laterally projecting supporting lugs 117 formed on one side of the cross head as clearly shown in Figs. 11 and 12 of the drawings. The links 113 are yieldingly held in a horizontal position and in engagement with the lugs 117 by a leaf spring 118 secured midway between its ends to the upper side of the cross head 114. The outer ends of the spring when thus arranged bear on the outer ends of the links 113 and upper ends of the plunger bars 111 so that when said clamping mechanism is lowered to bring the clamping plates 110 into engagement with the staves a yielding pressure will be imparted to the stave through the spring 118. The pressure of the spring is sufficiently strong to force the ends of the stave down and to hold the same upon the plate 85 and to cause the dies to make an impression in the stave.

The clamping mechanism is raised and lowered to bring the clamping plates out of and into contact with the ends of the staves by means of a lever 119 which is pivotally mounted on a bearing lug 120 formed on the upper end of the frame 84 and which lever is provided on its inner end with a circular head 121 adapted to engage or work between upper and lower laterally projecting lugs 122 formed on one side of the cross head 114 as shown. The outer end of the lever 119 is connected by an adjustable operating rod or link 123 to the outer end of a lever 124, the inner end of which is pivotally connected to one of the side members of the main frame as shown. On one side of the lever 124 is revolubly mounted a roller 125 with which is adapted to be engaged a cam or eccentric 126 which is fixedly mounted on the adjacent end of the shaft 47 whereby at each revolution of said shaft the cam 126 will be brought into engagement with the roller 125 thus lifting the lever 124. The movement of the lever when thus actuated is imparted through the adjustable rod 123 to the outer end of the lever 119 thus rocking the latter and causing the inner end thereof to force the clamping mechanism downwardly into operative engagement with the ends of the staves. It will be understood that the cam 126 is arranged on the shaft 47 in position to engage the roller and lift the lever 124 at the proper time for actuating the clamping mechanism. The connecting rod 123 between the levers 119 and 124 comprises a central tubular member 127 the opposite ends of which are interiorly threaded and have engaged therewith the threaded inner ends of eye bolts 128 whose eyes are connected with the levers 119 and 124 as shown. By thus forming the connecting rod between the levers 119 and 124 in adjustably connected sections the strokes of the levers may be controlled and the operation of the clamping mechanism thus regulated to engage staves of greater or less thickness or to bring the clamping plates 110 into engagement with the staves with greater or less force.

In order to provide for the lengthwise adjustment of the staves when placed on the receiving springs 92, I provide an adjustable end stop comprising a threaded rod or bolt 129 having on its inner end a head or stop plate 130 and having a screw threaded engagement with a threaded passage formed in one end of the frame 84 as clearly shown in Fig. 1 of the drawing. On the bolt or rod 129 and adapted to be screwed into engagement with the opposite sides of the ends of the frame 84 are jam nuts 131 whereby the bolt after being adjusted is locked in position so that the plate 130 on the inner end thereof forms a stop with which the ends of the staves are engaged when placed in the machine as described.

Figures 15, 16, 17, 18:
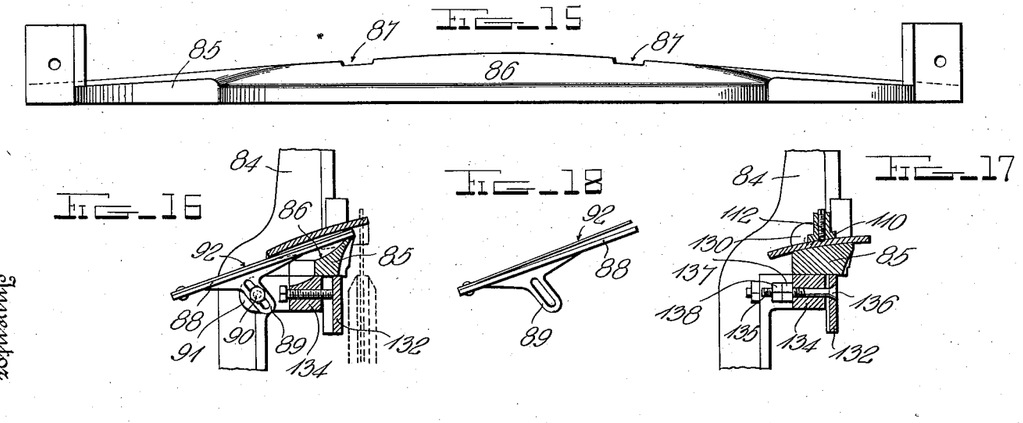
Fig. 15 is a side view of the same.
Fig. 16 is a vertical cross section on the line 16—16 of Fig. 13.
Fig. 17 is a similar view on the line 17—17 of Fig. 12.
Fig. 18 is a detail side view of one of the stave receiving and holding devices.
Figures 25, 29:
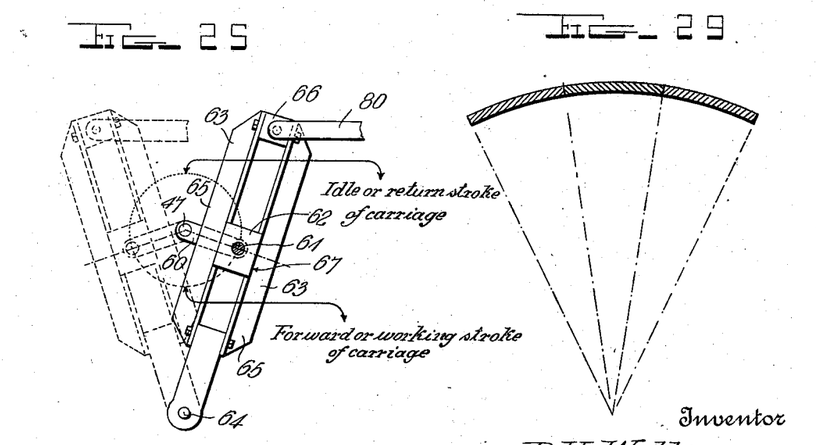
Fig. 29 is a cross sectional view of three staves showing the bevel or angle formed on the edges thereof when the staves are cut whereby said edges will form a perfect joint when the staves are brought together to form the barrel.

In forming the staves the ends of the same must be cut to taper from the center of the staves so that when the staves are assembled to form the barrel their edges will properly join. In order to cause the saw to cut the edges of the staves in this manner, I provide a suitable guiding mechanism for the saw carriage, said mechanism comprising a flat guide rail 132 secured at one end to a bracket 133 secured to and projecting upwardly from one side of the main frame as shown in Fig. 3 of the drawings. The opposite end of the guide rail 132 is secured to an adjusting plate 134 bolted or otherwise rigidly secured to the side members of the frame 84. The guide rail 132 is connected to the plate 134 by a series of retracting bolts 135, the outer ends of which are secured to the guide rail 132 by tapered counter sunk heads 136, while on the threaded opposite ends of the bolts are arranged adjusting nuts 137 and clamping nuts 138. Arranged in the plate 134 between the bolts 135 are adjusting screws 139, the inner ends of which are engaged with the inner side of the guide rail whereby when said adjusting screws are screwed inwardly and the nuts on the threaded ends of the bolts 135 are loosened, the guide rail 132 may be forced outwardly to a greater or less extent beyond the adjacent side of the plate 134, thus permitting said guide rail to be bowed or curved to a greater or less extent and at any desired point. By thus adjusting the guide rail the taper which it is desired to give to the ends of the barrel staves may be given to the guide rail so that when the saw carriage is brought into position to engage the saw with the stave the carriage will be guided to cause the saw to cut the stave in the shape desired. The saw carriage is engaged with and directed by the guide rail 132 by means of the guide lugs 25 and rollers 27 hereinbefore described. By arranging the stave supporting mechanism at an angle as shown in Figs. 16 and 17 of the drawings, the edge of the stave will be presented to the saw at the proper angle to cause the saw to cut the edge of the stave on a bevel as indicated in Fig. 29 of the drawings, and by clamping the stave down on the holding mechanism whereby the stave is held in the shape the same assumes when formed in the barrel, the angle or bevel will be formed on the edge of the stave along its entire length so that a perfect joint will be formed between the engaged edges of the staves when assembled to form the barrel.

The listings or waste after having been cut from the stave in the manner described fall back into an inclined chute or trough 140 arranged in rear of the stave supporting mechanism as clearly shown in Fig. 3 of the drawings. The trough 140 is preferably supported on bars 141 which are bent into proper form for supporting the trough in position. The listings after falling into the trough will slide down and out of the same into curved listings receiving arms 142 secured to the rear side of the machine as shown. In falling into the arms 142 the listings will straighten themselves and may be readily bunched together and removed from the arms.

The stave when finished is thrown by the operator into the hopper of a registering or recording device shown in another application filed by me.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A stave jointing machine comprising a main supporting frame, a saw carriage adapted to travel on said frame, a saw operatively mounted in said carriage, a stave holding plate having its upper surface curved from the center toward its ends and inclined outwardly, spring stave receiving devices adapted to hold the stave substantially horizontal when first placed in position on said plate, a stave shifting mechanism adapted to move the stave evenly across said receiving devices and into engagement with said plate, an adjustable end gage adapted to receive the ends of the staves when placed on said receiving devices, and means to bend and clamp the staves down into operative engagement with said holding plate.

2. A stave jointing machine comprising a main supporting frame, a saw carriage adapted to travel on said frame, a saw operatively mounted in said carriage, a transversely notched stave holding plate having its upper surface curved from the center toward its ends, spring stave receiving devices standing normally above said notches and adapted to hold the stave when first placed in position in the supporting mechanism, a stave shifting mechanism adapted to move the stave evenly across said receiving devices and into engagement with said plate, and means to bend and clamp the staves down into operative engagement with said holding plate.

3. A stave jointing machine comprising a main supporting frame, a carriage movable thereon, a saw operatively mounted on the carriage, work-supporting mechanism including a vertically movable clamp and beneath it a stave-holding plate having its operative surface curved longitudinally and inclined laterally and provided with two transverse notches, and stave-receiving devices adapted to hold the stave substantially horizontal when first placed in position upon said work-support, the same comprising upright plates having slotted lugs, set screws engaging the slots of said lugs for supporting the plates, and springs secured at one end to one extremity of the plates with their other ends lying out of contact with the other extremities thereof, said extremities lying in the notches and the free ends of the springs standing above them, for the purpose set forth.

4. A stave jointing machine comprising a main supporting frame, a saw carriage adapted to travel on said frame, a saw revclubly mounted in said carriage, a work holding plate, stave receiving devices adapted to coact with said holding plate to support a stave when first placed thereon, a gage adapted to indicate the saw line, said gage comprising a stationary attaching plate, a stave engaging plate hingedly connected to said attaching plate, a spring to hold said stave engaging plate in position to form a yielding stop for the stave, and automatically operated stave clamping devices adapted to bend and clamp the stave down upon said holding plate after said stave has been adjusted in position thereon.

5. A stave jointing machine comprising a main supporting frame, a saw carriage adapted to travel on said frame, a saw operatively mounted in said carriage, a work holding plate having its upper surface curved from the center toward its ends and inclined outwardly and downwardly to support a stave in position wherein the saw will cut the edges of the stave on a bevel, clamping devices adapted to bend the ends of the stave down and clamp the same in position on said holding plate, adjustable stave receiving bars, stave receiving springs secured to said bars and adapted to receive and hold the staves in position to be bent down and clamped by said clamping members, and means to shift the stave evenly across said receiving devices and in position to be engaged by the saw.

6. A stave jointing machine comprising a main supporting frame, a saw carriage adapted to travel on said frame, a saw operatively mounted in said carriage, a work supporting mechanism comprising a stave holding plate having its upper surface curved from the center toward its ends and inclined outwardly, spring stave receiving devices adapted to hold the stave when first placed in position in the supporting mechanism, a gage adapted to indicate the saw line or the position of said stave for being cut, a stave shifting mechanism adapted to move the stave evenly across said receiving devices and into engagement with said plate, said shifting devices, comprising a rock shaft, upwardly extending arms adjustably secured to said shaft, stave engaging plates arranged on the upper ends of said arms, an operating handle connected to one of said arms, a stop adapted to gage and hold said arms when swung to an inoperative position, an adjustable end gage adapted to receive the ends of the staves when placed on said receiving devices, and means to bend and clamp the staves down into operative engagement with said holding plate.

7. A stave jointing machine comprising a main supporting frame, a saw carriage adapted to travel on said frame, a saw revolubly mounted in said carriage, a work holding plate having its upper surface curved from the center toward the ends thereof, a guide way on its outer side between said ends, stave receiving devices adapted to coact with said holding plate to support a stave when first placed thereon, a gage adapted to indicate the saw line, said gage comprising a stationary attaching plate, a stave engaging plate hingedly connected to said attaching plate, a spring to hold said stave engaging plate in position to form a yielding stop for the stave, and automatically operated stave clamping devices adapted to bend and clamp the stave down into operative engagement with said holding plate after said stave has been adjusted in position thereon.

In testimony whereof I have hereunto set my hand in presence of two subscribing witnesses.

PERRY HAZARD WILLIAMS.

Witnesses:
WM. H. FITZ HUGH,
GEO. E. TAYLOR.

---

Copies of this patent may be obtained for five cents each, by addressing the "Commissioner of Patents, Washington, D. C."